United States Patent Office 2,854,421
Patented Sept. 30, 1958

2,854,421

WATER EMULSION PAINT CONTAINING CARBOXYMETHYL DEXTRAN AS A THICKENER

Elwood P. Wenzelberger, Dayton, Ohio, assignor, by mesne assignments, to Midland Chemical Corporation, Dayton, Ohio, a corporation of Delaware No Drawing. Application September 16, 1954
Serial No. 456,624

2 Claims. (Cl. 260—17.4)

Water-emulsion paints generally include thickening agents for regulating the viscosity of the paint.

It is an object of this invention to provide improved water-emulsion paints containing carboxymethyl dextran as the thickening agent.

The water-emulsion paint of the invention may be of the natural latex type, or it may be a "synthetic latex" paint, i. e., an aqueous emulsion of a synthetic resin having latex-like properties. The resin or "synthetic latex" may be a copolymer of a mixture of polymerizable unsaturated hydrocarbons, including a monovinyl aromatic hydrocarbon and between 40 and 60 mole percent of an aliphatic conjugated diolefine.

Suitable copolymers which may be employed in preparing the paints are copolymers of styrene and butadiene-1,3; copolymers of styrene and isoprene; copolymers of nuclear methylated styrene and butadiene; copolymers of nuclear methylated styrene and butadiene; copolymers of nuclear ethylated styrene and isoprene; copolymers of styrene, butadiene-1,3 and methylmethacrylate; copolymers of styrene, butadiene-1,3 and vinylchloride; copolymers of styrene, butadiene-1,3 and vinylidene chloride, etc. In making all of these copolymers for use in the water-emulsion paint the diolefine should be present in the polymerizable mixture in a proportion within the range given hereinabove. In copolymers containing polymerized compounds other than a vinyl aromatic compound and the diolefine, the vinyl aromatic compound should be present in an amount corresponding to at least 15 mole percent of the total monomers.

Emulsion water paints of the natural latex type may be prepared, in accordance with the invention, by diluting natural latex with water and dispersing pigment and carboxymethyl dextran therein with the aid of a suitable dispersing agent. Other modifying agents including a protective colloid, fillers, or plasticizers may be added.

Emulsion-water paints of the synthetic latex type may be prepared by polymerizing a mixture of the selected monomers, e. g., styrene and butadiene-1,3 in aqueous emulsion in accordance with known procedures. Usually, the polymerizable compounds, in relative proportions corresponding to the composition desired for the copolymer, are mixed with an aqueous solution of an emulsifying agent and the mixture is agitated to effect emulsification. A number of different emulsifying agents are suitable and may be used, including sodium oleate, Aquarex D (a sodium sulfate ester of higher alcohols) and sodium sulfonates of alkylated naphthalenes, biphenyls, etc. The emulsifying agent is usually employed in an amount corresponding to from 0.5 to 5.0 percent of the weight of the polymerizable organic compounds, but may be used in smaller or larger proportions. A peroxide such as hydrogen peroxide, potassium persulfate or benzoyl peroxide, is usually added in an amount of from 0.5 to 4.0 percent of the weight of the compounds to be polymerized, but is not required. The emulsion is heated in a closed container, usually at 50° C. to 100° C. to effect the polymerization. The progress and extent of the polymerization reaction may be followed by observing the decrease in pressure as the reaction progresses.

After completing the polymerization, the reactor is cooled, opened, the emulsion is broken, and the copolymer is recovered. It may be emulsified in water and the other ingredients to be incorporated in the paint added, including pigment and the carboxymethyl dextran. If desired, the emulsion resulting from the copolymerization reaction may be used directly as the paint after the inclusion of pigment, the carboxymethyl dextran, and such other substances as are to be incorporated therein.

The production of carboxymethyl dextran is described in the pending application of L. J. Novak et al., Ser. No. 346,016, filed March 31, 1953. As disclosed therein, the selected dextran and a carboxymethylating agent are reacted together in an aqueous alkaline medium whereby the carboxymethyl group is substituted for one or more hydroxyl groups in the dextran molecule. Suitable carboxymethylating agents are chloracetic acid, sodium chloracetate or chloracetamide. The reaction with the dextran is carried out in an aqueous solution of a strong alkali metal hydroxide, such as sodium, potassium or lithium hydroxide. Preferably, the dextran is treated, in aqueous solution or suspension, with an excess of sodium or potassium hydroxide at a temperature of 50° C. to 100° C. for from ten minutes to two hours. Preferably, also, the molar ratio of sodium or potassium chloracetate to dextran is between 2:1 and 12:1, the molar ratio of sodium or potassium hydroxide to dextran is between 5:1 and 15:1, and the molar ratio of water to dextran is between 70:1 and 120:1. The carboxymethyl dextrans obtained have a D. S. (degree of substitution or average number of carboxymethyl groups per anhydroglucopyranosidic unit of the dextran) of from 0.5:1 to 3:1.

The reaction product is a viscous mass comprising the sodium or potassium salt of the carboxymethyl dextran. This mass comprising the salt of the ether may be precipitated from the crude reaction mass by addition thereto of a non-solvent for the salt, such as a water-miscible alcohol or ketone, e. g., methyl, ethyl, propyl, isopropyl or t.butyl, alcohol or acetone.

The free carboxymethyl dextran may be recovered from the salt by mixing the latter with water, acidifying to pH about 2.0, and precipitating the ether by means of acetone or a water-miscible alcohol. The pH of 2.0 is not critical and the ether may be precipitated at other pH values on the acid side. However, the highest yields of the free ether have been obtained by precipitation at pH 2.0.

The dextran reacted with the carboxymethylating agent may be obtained in various ways. It is usually biosynthesized from sucrose by microorganisms of the *Leuconostoc mesenteroides* and *L. dextranicum* types, or their enzymes. Microorganisms (or their enzymes) which may be used include those bearing the following NRRL (Northern Regional Research Laboratory) designations: *Leuconostoc mesenteroides* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The procedure is to inoculate a culture of the microorganism, or the enzyme filtered from the culture, into an aqueous sucrose-bearing nutrient medium and incubate the mass until the dextran is synthesized in maximum yield, whereupon the dextran is precipitated by adding a water-miscible aliphatic alcohol or acetone to the fermentate. The precipitated dextran is preferably purified and reduced to fine powder form for the carboxymethylating reaction. As precipitated, the "native" dextran is normally characterized by a very high molecular weight, calculated to be in the millions. It may be converted to the carboxymethyl ether at the high molecular weight or it may be suitably hydrolyzed to lower molecular weight dextran prior to forming the ether.

Relatively small amounts of the carboxymethyl dextran, which may have a D. S. of 0.5 up to 3.0, and preferably has a D. S. of 2.0 to 3.0, are effective for increasing the viscosity of the paint and improving its brushing quality, amounts between 0.1% and 5.0% on the weight of the paint being satisfactory.

A preferred carboxymethyl dextran for the present purposes is the ether derived from *Leuconostoc mesenteroides* B–512 native (unhydrolyzed) dextran (or equivalent dextrans) containing an average of 2.0 to 3.0 carboxymethyl groups per anhydroglucopyranosidic unit. This carboxymethyl dextran is preferred because of its striking effectiveness in markedly increasing the viscosity of the paint in extremely small concentrations, amounts as small as 0.1 to 0.6% of the ether being sufficient to adjust the viscosity so that the paint can be brushed on a surface smoothly and readily without streaking or running.

The water-emulsion paints contain, in addition to the natural or synthetic latex, pigments such as titanium oxide, white lead, lithopone, mica, zinc sulfide, etc. The pigment may be present in varying amount and usually the paint contains from 15 to 100 parts of the latex per 100 parts of pigment, the preferred proportion being dependent on the use to which the paint is to be applied. For interior application, a ratio of from 15 to 25 parts of latex per 100 parts of pigment is satisfactory. For exterior application, between 25 and 35 parts of latex are used per 100 parts of pigment.

The other ingredients usually included in water-emulsion paints may be present, such as antioxidants of the type of the aromatic secondary amines, polyhydric phenol, and aldehyde-amine condensation products, the antioxidant being added in an amount of 0.5 to 1.5% of the weight of the latex. Paint driers, fillers, pH control stabilizers and like conventional paint ingredients may be added. The paint may also contain preservatives of the type of sodium pentachlorophenate and protective colloids such as soya protein or casein, but an advantage of the use of carboxymethyl dextran as thickening agent is that the preservatives and protective colloids ordinarily required are not essential and may be omitted. Thus, the carboxymethyl dextran, serving as thickener and also as protective colloid will eliminate the need for casein and other similar colloids which tend to decompose and sometimes undergo warm humid conditions.

The paint may be prepared as a concentrated aqueous dispersion of from 40 to 65% solids content, diluted to a desired concentration with water, and applied in the usual ways, e. g., by brushing, dipping or spraying to surfaces of wood, metal, or masonry, etc. The viscosity resulting from the presence of the carboxymethyl dextran is such that the paint can be brushed on smoothly, the large molecules of the carboxymethyl dextran tending to be attenuated by the brushing action to leave a smooth, uniform film which dries rapidly, is not subject to putrefaction, and is resistant to abrasion on washing. The carboxymethyl dextran is not only attractive due to the effectiveness of small amounts thereof in increasing the viscosity of the paint and the resulting economy, but also definitely improves the quality of the paint and of the films thereof formed on the wall or other surface on drying.

The following examples are illustrative of specific embodiments of the invention, it being understood that these examples are not limitative. The ingredients are given in parts by weight.

Example I

A mixture of 21.0 parts titanium dioxide, 6.0 parts lithopone and 3.0 parts mica was ground with 0.07 part of 2-amino-2-methyl-1-propanol as grinding agent and dispersed in the latex, to which was also added 1.9 parts of casein, 0.15 part tetrasodium pyrophosphate and 0.19 part ammonia (26°Be') as pH control stabilizers, and 0.07 part of sodium pentachlorphenate as preservative. 0.10 part of carboxymethyl dextran derived from *L. m.* B–512 native dextran and containing an average of 2.8 carboxymethyl groups per A. G. U. was then added. The mixture is stirred and passed through a paint mill to obtain a substantially uniform paste for marketing. Prior to use, the paste is diluted with 49.52 parts of water.

Example II

A mixture of 16.13 parts titanium dioxide, 6.0 parts lithopone, and 3.0 parts mica was ground with 0.24 part of "Tergitol" (sulfate of alcohol of 8 to 17 carbons marketed by American Cyanamid Co.), and dispersed in a mixture of 7.14 parts (solids basis) of natural latex and 8.17 parts of a copolymer containing in the polymer molecule, about 43.8 mole percent of styrene and 56.2 mole percent of butadiene. To this mixture there was added 0.05 part sodium pentachlorophenate as preservative, 0.15 part of tetrasodium pyrophosphate as pH control stabilizer, and 0.14 part of carboxymethyl dextran as in Example I. The mass is stirred and put through a paint mill to obtain a uniform paste to be marketed. Prior to use, it is diluted with about 37.90 parts of water.

Example III

A mixture of 25 parts titanium dioxide and 6.0 parts mica was ground with 1.0 part of glycerine monoricinoleate and dispersed in a mixture of 9.36 parts (solids basis) of natural latex and 8.30 parts of a copolymer of 55.7 mole percent butadiene-1,3, 29 mole percent styrene and 15.3 mole percent vinylidene chloride, to which was also added 3.0 parts of casein, 0.05 part of sodium pentachlorophenate as preservative, and 0.65 part of carboxymethyl dextran as in Example I. The mixture is thoroughly stirred and put through a paint mill to obtain a homogeneous paste. Prior to use, it is diluted with 45.74 parts of water.

Various modifications and changes may be made in practicing the invention, including variations in the particular adjuvants (pigments, fillers, etc.) used, without departing from the scope of the invention which is not intended to be limited except as defined in the appended claims.

What is claimed is:

1. A stable water emulsion paint composition consisting of a vehicle, pigment dispersed in the vehicle, and from 0.1% to 5.0% by weight on the paint weight of carboxymethyl dextran containing an average of 0.5 to 3.0 carboxymethyl groups per anhydroglucose unit, the vehicle being selected from the group consisting of natural latex and aqueous dispersions of copolymers containing, in the copolymer molecule, a monovinyl aromatic hydrocarbon selected from the group consisting of styrene and nuclearly alkylated styrenes and from 40 to 60 mole percent of a diolefine selected from the group consisting of isoprene and butadiene.

2. A stable water emulsion paint composition consisting of a vehicle which is an aqueous dispersion of a copolymer containing, in the copolymer molecule, styrene and from 40 to 60 percent of butadiene, a pigment dispersed in the vehicle, and from 0.1% to 5.0% by weight on the paint weight of a carboxymethyl ether of a microbiologically produced, native high molecular weight dextran which ether contains an average of from 0.5 to 3.0 carboxymethyl groups per anhydroglucose unit of the dextran.

References Cited in the file of this patent

UNITED STATES PATENTS

| | | |
|---|---|---|
| 2,518,135 | Gaver | Aug. 8, 1950 |
| 2,537,190 | Lankau et al. | Jan. 9, 1951 |
| 2,602,082 | Owen | July 1, 1952 |
| 2,671,779 | Gaver et al. | Mar. 9, 1954 |
| 2,676,930 | McKay et al. | Apr. 27, 1954 |
| 2,683,700 | Gehring | July 13, 1954 |
| 2,758,103 | Henson | Aug. 7, 1956 |